(12) United States Patent
Mednik

(10) Patent No.: US 8,907,580 B2
(45) Date of Patent: Dec. 9, 2014

(54) CIRCUIT AND METHOD FOR FLICKER SUPPRESSION IN LIGHT EMITTING DIODES (LEDS)

(71) Applicant: Alexander Mednik, Campbell, CA (US)

(72) Inventor: Alexander Mednik, Campbell, CA (US)

(73) Assignee: Supertex, Inc., Sunnyvale, CA (US)

( * ) Notice: Subject to any disclaimer, the term of this patent is extended or adjusted under 35 U.S.C. 154(b) by 196 days.

(21) Appl. No.: 13/757,780

(22) Filed: Feb. 2, 2013

(65) Prior Publication Data

US 2014/0217911 A1    Aug. 7, 2014

(51) Int. Cl.
  *H05B 33/08*    (2006.01)
(52) U.S. Cl.
  CPC .................................. *H05B 33/0815* (2013.01)
  USPC ...................................................... 315/209 R

(58) Field of Classification Search
  USPC ................... 315/209 R, 244, 185 R, 291, 307
  See application file for complete search history.

(56) References Cited

U.S. PATENT DOCUMENTS

2001/0052827 A1*  12/2001  Sugita et al. ................... 332/109
2002/0057584 A1*   5/2002  Brockmann ..................... 363/98

* cited by examiner

*Primary Examiner* — Minh D A
(74) *Attorney, Agent, or Firm* — Weiss & Moy, P.C.; Jeffrey D. Moy

(57) ABSTRACT

A circuit for flicker suppression in a Light Emitting Diode (LED) has a latch. The latch has a first state set with a trailing edge of Pulse Width Modulated Dimming (PWMD) pulse, and a second state set delayed with respect to the PWMD trailing edge. A trigger circuit is coupled to the latch. The trigger circuit sends a signal to the latch to change to the second state when a decision point occurs during a time following a duty limit $D_{max}$ of a gate of a LED driver circuit.

9 Claims, 8 Drawing Sheets

CIRCUIT AND METHOD FOR FLICKER SUPPRESSION IN LIGHT EMITTING DIODES (LEDS)

RELATED APPLICATION

The present patent application is related to U.S. Provisional Application Ser. No. 61/594,020, filed Feb. 2, 2012, in the name of the same inventors listed above, and entitled, "CIRCUIT AND METHOD FOR FLICKER SUPPRESSION IN LEDS". The present patent application claims the benefit under 35 U.S.C. §119(e).

BACKGROUND

The present invention relates generally to a Light Emitting Diodes (LEDs) and, more specifically, to a circuit and method for flicker suppression in LEDs.

Recent developments of high-brightness light emitting diodes (LED) have opened new horizons in lighting. Highly efficient and reliable LED lighting continuously wins recognition in various areas of general lighting, especially in areas where cost of maintenance is a concern.

A wide dynamic range of the LED brightness control becomes important in many applications, such as automobiles, avionics and television. In some cases it is needed due to large variation in the ambient light, in others it allows to improve the contrast ratio of a display. Due to the color and chromaticity properties of LED's, it is beneficial to control brightness of an LED through pulse width modulation of the current in it, while maintaining the current magnitude at a fixed level. This LED brightness control method is commonly referred to as the PWM dimming.

Referring now to FIG. 1, one example of a PWM dimming scheme in a prior art LED driver of the boost type is shown. The boost converter power train (hereinafter boost converter) in the FIG. 1 includes an inductor 103 receiving input power from an input voltage source 101 via a power switch 102, and delivering power to an output filter capacitor 106 and an LED string 107 via a rectifier diode 105.

The brightness control circuit of the boost converter of FIG. 1 includes a PWM switch 108 receiving a brightness control signal from a PWM pulse generator, the PWM switch 108 periodically disconnecting the LED string 107 from the output of the boost converter when the output of the PWM pulse generator 100 is low. The brightness control circuit also includes an LED current sense element 109; an error amplifier 110 having a reference IREF and a compensator network 112; a hold switch 111 for disconnecting the compensator network 112 from the output of the error amplifier 110 when the output of the PWM pulse generator 100 is low; a peak current sense element 104 for detecting peak current in the inductor 103; a current sense comparator 115 for comparing the output of the current sense element 104 with an error voltage at the compensator network 112, and for generating a reset signal when the error voltage is exceeded; a PWM latch turning the power switch 102 on upon receiving a clock signal 117, and turning the switch 112 off upon receiving the reset signal; a logic gate 118 for inhibiting the turn on of the switch 102 when the output of the PWM pulse generator 100 is low.

When the PWM dimming pulse 100 becomes very small (less than one switching cycle for a DCM design or less than a few switching cycles for a CCM design), the boost converter is turned off before the input current can reach its steady state value. This may cause the input power to droop, which is manifested in the output as a droop in the LED current.

Referring to FIGS. 1 and 2, the inductor 103 current 203 begins with the first clock pulse 117 and 217 following the leading edge of the dimming pulse 100 and 200. The inductor 103 current 203 is not given enough time to reach the reference 212 generated by the error amplified 110, and the output current control loop opens.

Therefore, it would be desirable to provide a circuit and method that overcomes the above problems.

SUMMARY

A circuit for flicker suppression in a Light Emitting Diode (LED) has a latch. The latch has a first state set with a trailing edge of Pulse Width Modulated Dimming (PWMD) pulse, and a second state set delayed with respect to the PWMD trailing edge. A trigger circuit is coupled to the latch. The trigger circuit sends a signal to the latch to change to the second state when a decision point occurs during a time following a duty limit $D_{max}$ of a gate of a LED driver circuit.

A circuit for flicker suppression in a Light Emitting Diode (LED) has means for removing a duty cycle limit $D_{max}$ of a gate signal of an LED driver circuit past a decision point (DP) by terminating the gate signal upon meeting a reference signal sent to a comparator of the LED driver circuit.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
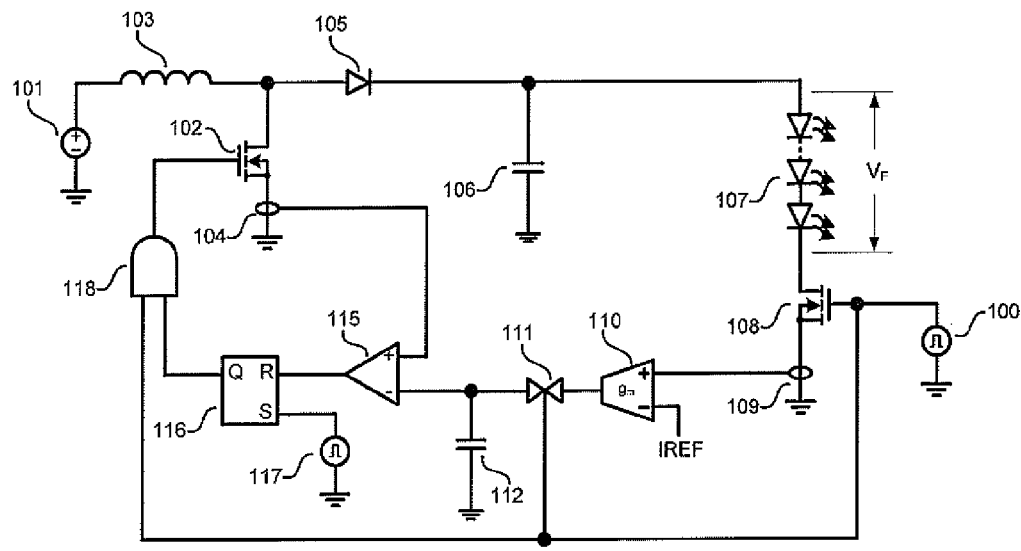
FIG. 1 shows one example of a PWM dimming scheme in a prior art LED driver of the boost type.
Figure 2:
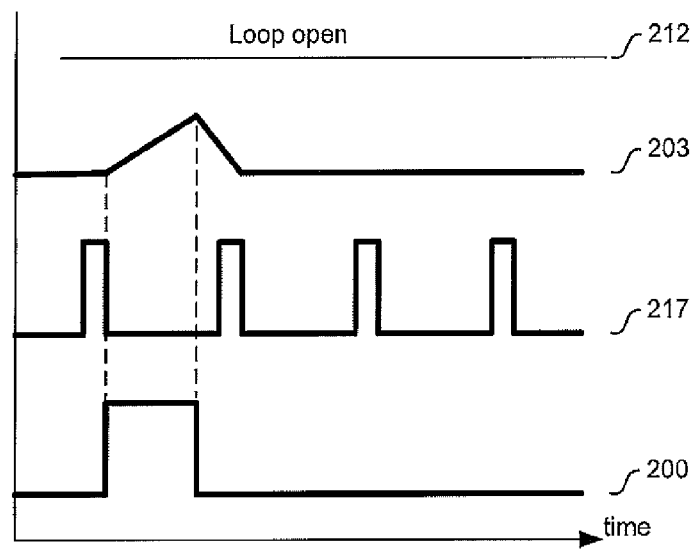
FIG. 2 shows a timing diagram for operation of the LED driver of FIG. 1.
Figure 3:
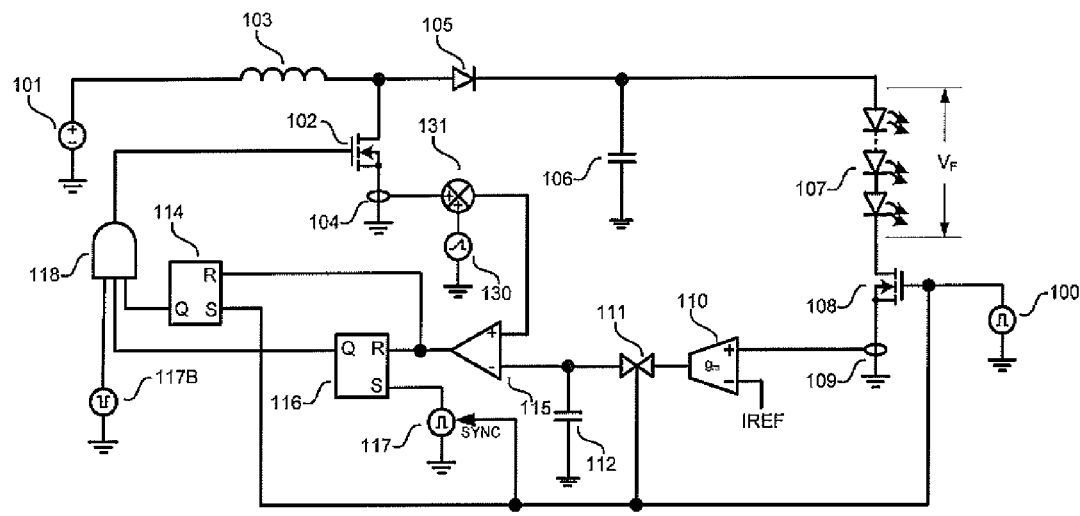
FIG. 3 shows an LED driver of the boost type which maintains control over the output current at any dimming pulse width.

Referring to FIG. 3, a boost converter maintaining control over the output current at any dimming pulse 100 width is shown. The boost converter of FIG. 3 is similar to that of FIG. 1. A slope compensation circuit 130, 131, as well as the maximum duty cycle limiter 117B, although is not relevant for explaining FIG. 3, are added for uniformity with the following embodiments. The switch 102 is activated at the switching frequency rate 117. The first clock 117 is synchronized with the leading edge of the dimming signal 100. The switch 102 is de-activated past the trailing edge of 100, once the reference at 112 is met at the comparator 115. The flip-flop 114 serves this function.

Figure 4:
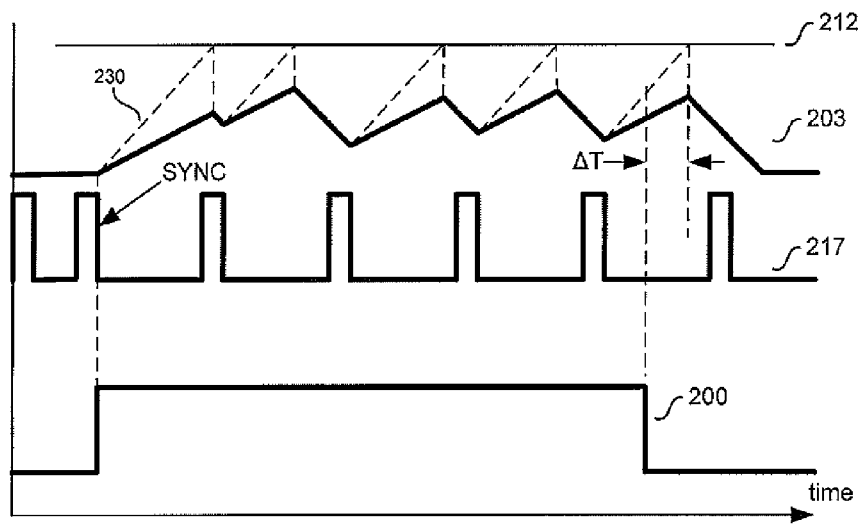
FIG. 4 shows a timing diagram for operation of the LED driver of FIG. 3 for a first delay of ΔT.
Figure 5:
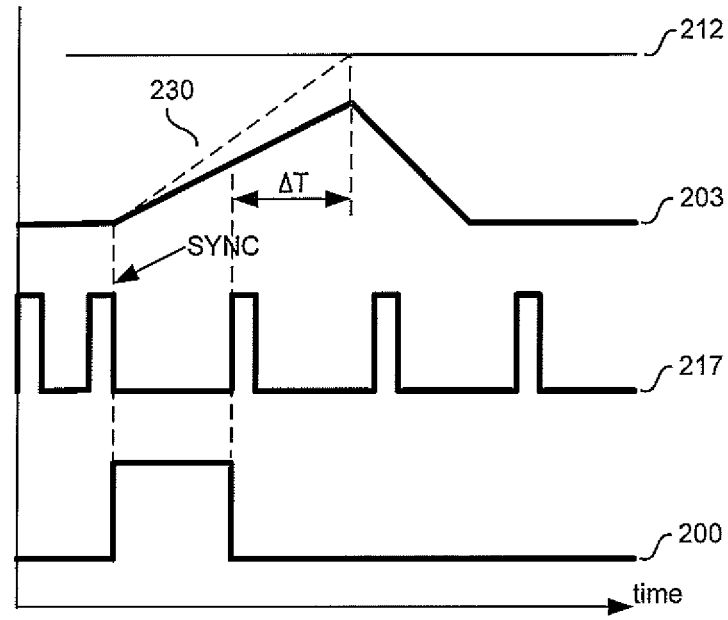
FIG. 5 shows a timing diagram for operation of the LED driver of FIG. 3 for a second delay of ΔT.

Referring to FIGS. 4 and 5, the turn-off of the switch 102 is delayed by ΔT with respect to the trailing edge of 200. Therefore the inductor 103 current 203 is given time to meet the reference 212. The added slope 230 represents slope compensation and resets to zero every clock pulse 217.

Figure 6:
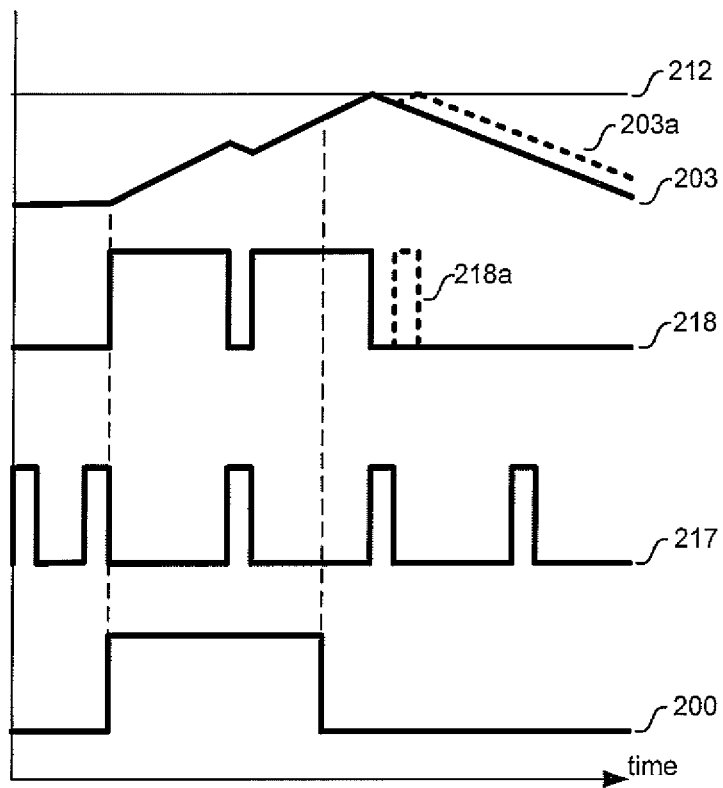
FIG. 6 shows a timing diagram for an intermittent reset pulse due to coincidence of meeting the reference 212 and reaching the maximum duty cycle 117B, without slope compensation.
Figure 7:
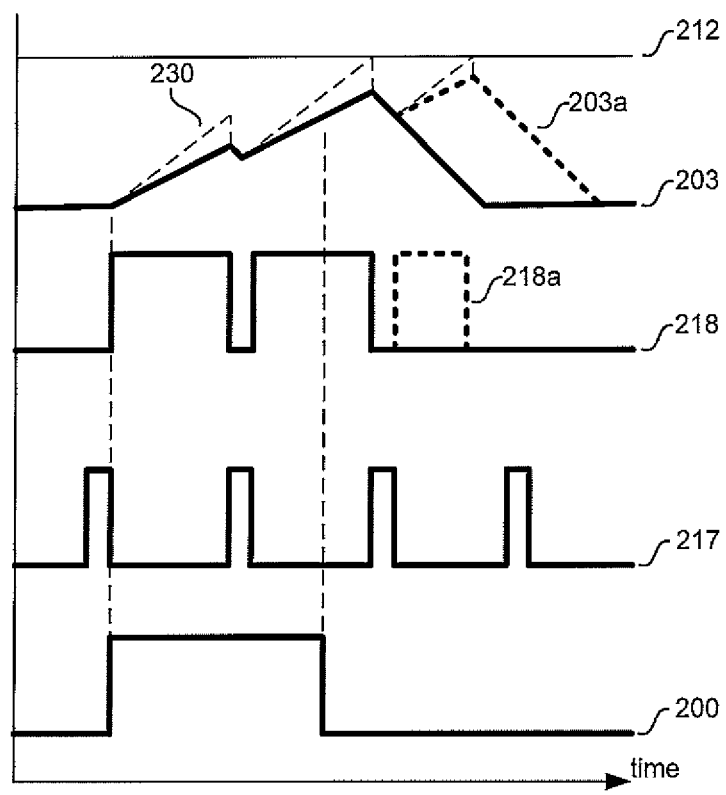
FIG. 7 shows a timing diagram of an intermittent reset pulse due to coincidence of meeting the reference 212 and reaching the maximum duty cycle 117B, in the presence of slope compensation.

The circuit of FIG. 3 suffers an indeterminate condition causing LED flicker. FIG. 6 shows the output waveform 218 of the gate 118 driving the switch 102. Slope compensation 230 is not included. Following the trailing edge of 200, the turn-off of 218 can occur by the maximum duty 117B, or by 203 meeting the reference 212. When the two conditions coincide, an extra-pulse 218a can appear intermittently, causing flicker 203a. The condition aggravates in the presence of the slope compensation 230, as shown in FIG. 7.

Figure 8:
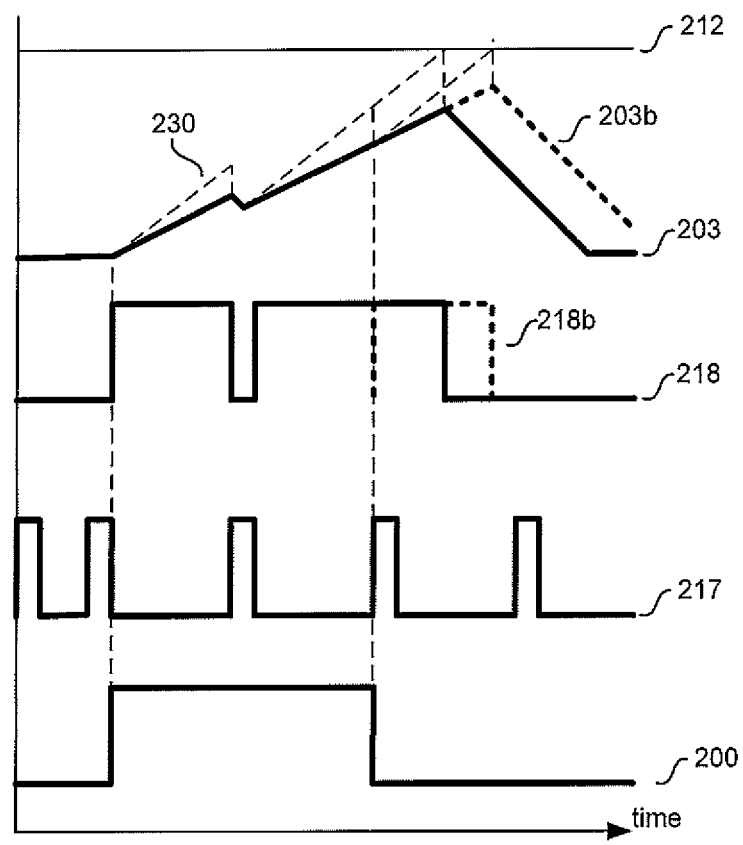
FIG. 8 shows a timing diagram of intermittent reset of slope compensation 230.

One way to resolve this indeterminate condition is by disabling the duty cycle limit 117B past the trailing edge of 200, hence letting the inductor current 203 meet the reference 212 in a single pulse 218. However, this causes another indeterminate condition, shown in FIG. 8. When the reset pulse 217 of the slope compensation 230 coincides with the trailing edge of 200, this reset of 230 can occur intermittently causing flicker 203b.

Figure 9:
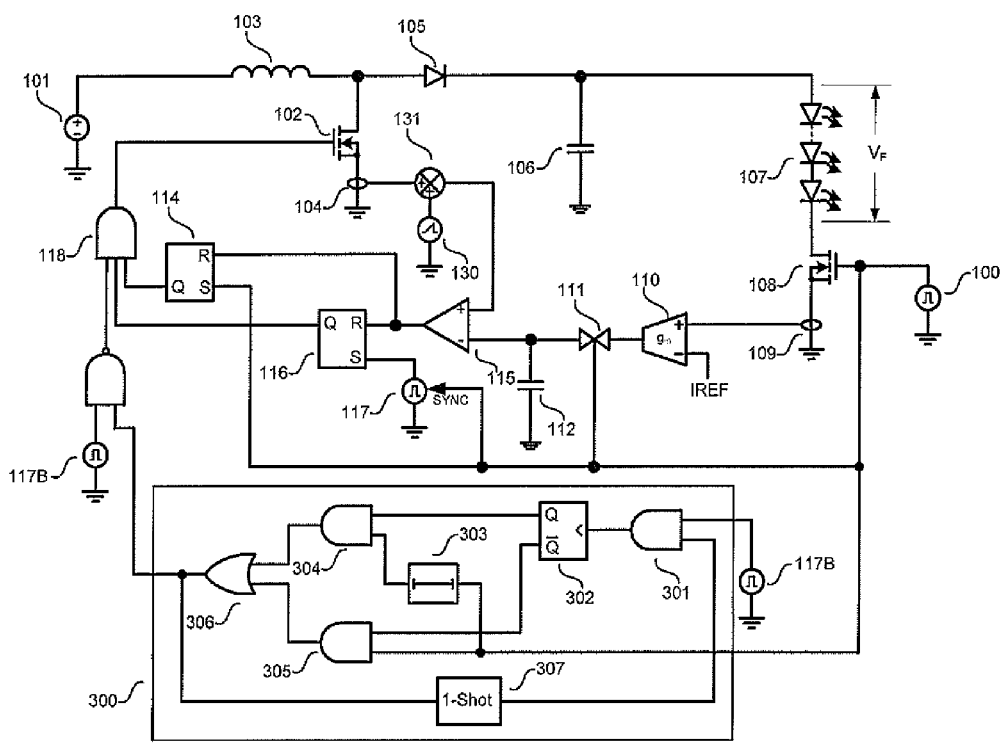
FIG. 9 shows an LED driver of the boost type of FIG. 3 with a decision point (DP) circuit of the present invention.
Figure 10A:
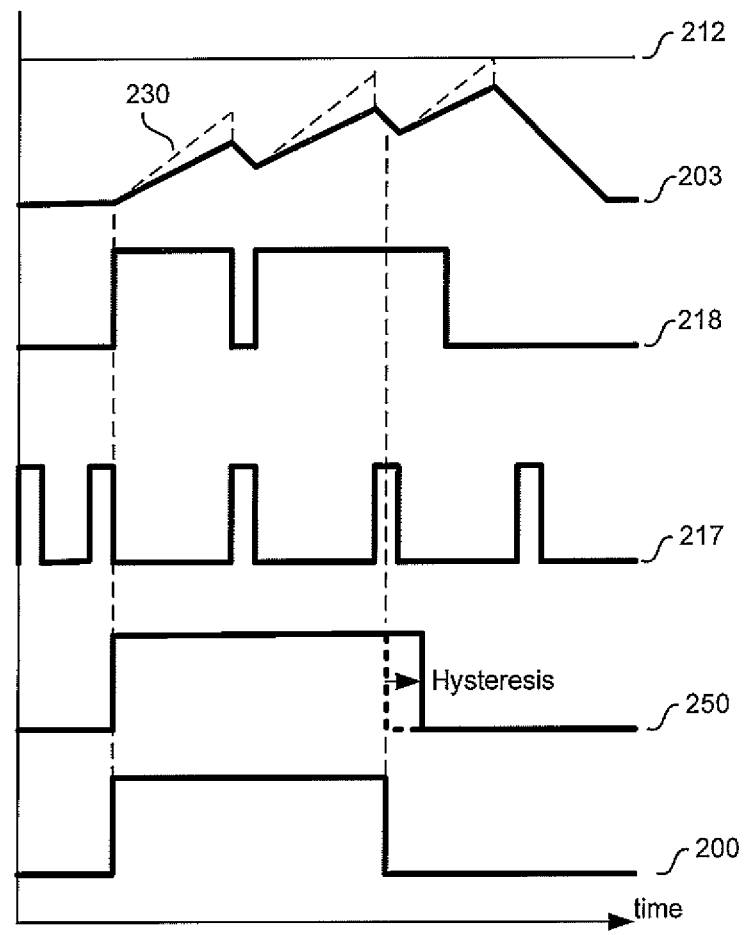
FIG. 10a shows a timing diagram resolving the indeterminate condition at Dmax: delayed DP.
Figure 10B:
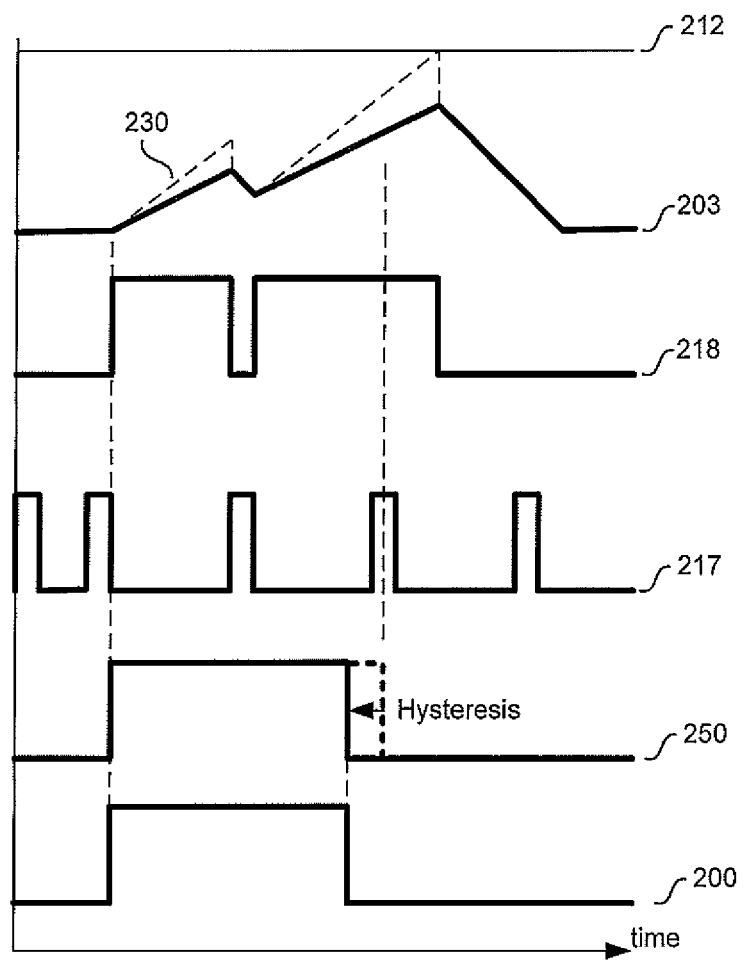
FIG. 10b shows a timing diagram resolving the indeterminate condition at Dmax: non-delayed DP.

The above indeterminate condition is resolved by using a DP circuit 300 shown in FIG. 9. FIGS. 10 and 11 show the output 250 of the DP circuit 300. The output 250 is determined by the output of a clocked toggle latch 302, and it can take two states: a) coinciding with the trailing edge of 200, and b) delayed by 303 with respect to the trailing edge of 200. If DP occurs during 117B, the latch 302 flips to the opposite state. The error amplifier 110 further corrects the compensation network 112 voltage to accommodate the new operating condition.

As shown in FIG. 9, the Decision Point (DP) circuit 300 (hereinafter circuit 300) is shown. The circuit 300 may be used with the LED driver circuit. An example of an LED driver circuit is shown in FIG. 3. The circuit 300 may be used to resolve an indeterminate condition and to eliminate flickering of the LEDs 107. The circuit 300 resolves this indeterminate condition by removing the duty cycle limit $D_{max}$ of the gate 118 (FIG. 1) past a decision point (DP). The GATE 118 signal is then terminated upon meeting the CS comparator 115 reference.

The circuit 300 may have a latch 302. The latch 302 may have a first state Q and a second state Q'. The latch 302 has an input which is coupled to a logic circuit which may be used to determine when a DP occurs. The logic circuit may be comprised of a plurality of logic gates. A first logic gate 304 may be coupled to an output of a first state of the latch 302 and to the PWM signal 100. A delay circuit 303 may be positioned between the logic gate 304 and the PWM signal 100. A second logic gate 305 may be coupled to an output of a second state of the latch 302 and to the PWM signal 100.

A third logic gate 306 has a first input coupled to the output of the first logic gate 304 and a second input coupled to the output of the second logic gate 305. The output of the third logic gate 306 may be used as a first input to a fourth logic gate 301. The fourth logic gate 301 has a second input coupled to a clock signal 117B. The output of the fourth logic gate 301 may be coupled to an input of the latch 202.

The DP may be determined by the output of the latch 302. The latch 302 may take two states: a first state coinciding with the trailing edge of the PWMD signal 100; and a second state which is delayed with respect to the trailing edge of the PWMD signal 100. If DP occurs during the time following the duty limit $D_{max}$ of the gate 118, the latch 302 flips to the opposite state. The error amplifier 110 further corrects the compensation network 112 voltage to accommodate the new operating condition.

While embodiments of the disclosure have been described in terms of various specific embodiments, those skilled in the art will recognize that the embodiments of the disclosure can be practiced with modifications within the spirit and scope of the claims.

What is claimed is:

1. A circuit for flicker suppression in a Light Emitting Diode (LED) comprising:
   a latch, the latch having a first state set with a trailing edge of Pulse Width Modulated Dimming (PWMD) pulse, and a second state set delayed with respect to the PWMD trailing edge; and
   a trigger circuit coupled to the latch, the trigger circuit sending a signal to the latch to change to the second state when a decision point occurs during a time following a duty limit $D_{max}$ of a gate of a LED driver circuit, wherein the trigger circuit comprises: a plurality of logic gates, wherein the plurality of logic gates provides the signal to the latch to change to the second state when a decision point occurs during a time following a duty limit Dmax of a gate of a LED driver circuit; and a delay circuit coupled to at last one of the plurality of logic gates.

2. The circuit for flicker suppression in a Light Emitting Diode (LED) in accordance with claim 1, wherein the trigger circuit has inputs coupled to a clock signal and the PWM pulse and an output coupled to the latch.

3. The circuit for flicker suppression in a Light Emitting Diode (LED) in accordance with claim 1, wherein the trigger circuit comprises:
   a plurality of logic gates; and
   a delay circuit coupled to at last one of the plurality o logic gates.

4. The circuit for flicker suppression in a Light Emitting Diode (LED) in accordance with claim 1, wherein the trigger circuit comprises:
   a first logic gate having a first input coupled to a first output of the latch and a second input coupled to a PWM signal of the Led driver circuit;
   a delay circuit coupled between the second input of the first logic gate and the PWM signal;
   a second logic gate having a first input coupled to a second output of the latch and a second input coupled to the PWM signal of the Led driver circuit;
   a third logic gate having a first input coupled to an output of the first logic gate and a second input coupled to an output of the second logic gate; and
   a fourth logic gate having a first input coupled to an output of the third logic gate, a second input coupled to a clock signal; and an output coupled to an input of the latch.

5. A circuit for flicker suppression in a Light Emitting Diode (LED) comprising:
   means for removing a duty cycle limit $D_{max}$ of a gate signal of an LED driver circuit past a decision point (DP) by terminating the gate signal upon meeting a reference signal sent to a comparator of the LED driver circuit, wherein the means comprises: a latch, the latch having a first state set with a trailing edge of Pulse Width Modulated Dimming (PWMD) pulse, and a second state set delayed with respect to the PWMD trailing edge; and a trigger circuit coupled to the latch, the trigger circuit sending a signal to the latch to change to the second state when a decision point occurs during a time following a duty limit Dmax of a gate of a LED driver circuit.

6. The circuit for flicker suppression in a Light Emitting Diode (LED) in accordance with claim 5, wherein the trigger circuit has inputs coupled to a clock signal and the PWM pulse and an output coupled to the latch.

7. The circuit for flicker suppression in a Light Emitting Diode (LED) in accordance with claim 5, wherein the trigger circuit comprises:
  a plurality of logic gates; and
  a delay circuit coupled to at last one of the plurality o logic gates.

8. The circuit for flicker suppression in a Light Emitting Diode (LED) in accordance with claim 5, wherein the trigger circuit comprises:
  a plurality of logic gates, wherein the plurality of logic gates provides the signal to the latch to change to the second state when a decision point occurs during a time following a duty limit $D_{max}$ of a gate of a LED driver circuit; and
  a delay circuit coupled to at last one of the plurality o logic gates.

9. The circuit for flicker suppression in a Light Emitting Diode (LED) in accordance with claim 5, wherein the trigger circuit comprises:
  a first logic gate having a first input coupled to a first output of the latch and a second input coupled to a PWM signal of the Led driver circuit;
  a delay circuit coupled between the second input of the first logic gate and the PWM signal;
  a second logic gate having a first input coupled to a second output of the latch and a second input coupled to the PWM signal of the Led driver circuit;
  a third logic gate having a first input coupled to an output of the first logic gate and a second input coupled to an output of the second logic gate; and
  a fourth logic gate having a first input coupled to an output of the third logic gate, a second input coupled to a clock signal; and
  an output coupled to an input of the latch.

* * * * *